April 21, 1931.　　　F. G. SLAGEL　　　1,802,093
VALVE
Filed April 1, 1929
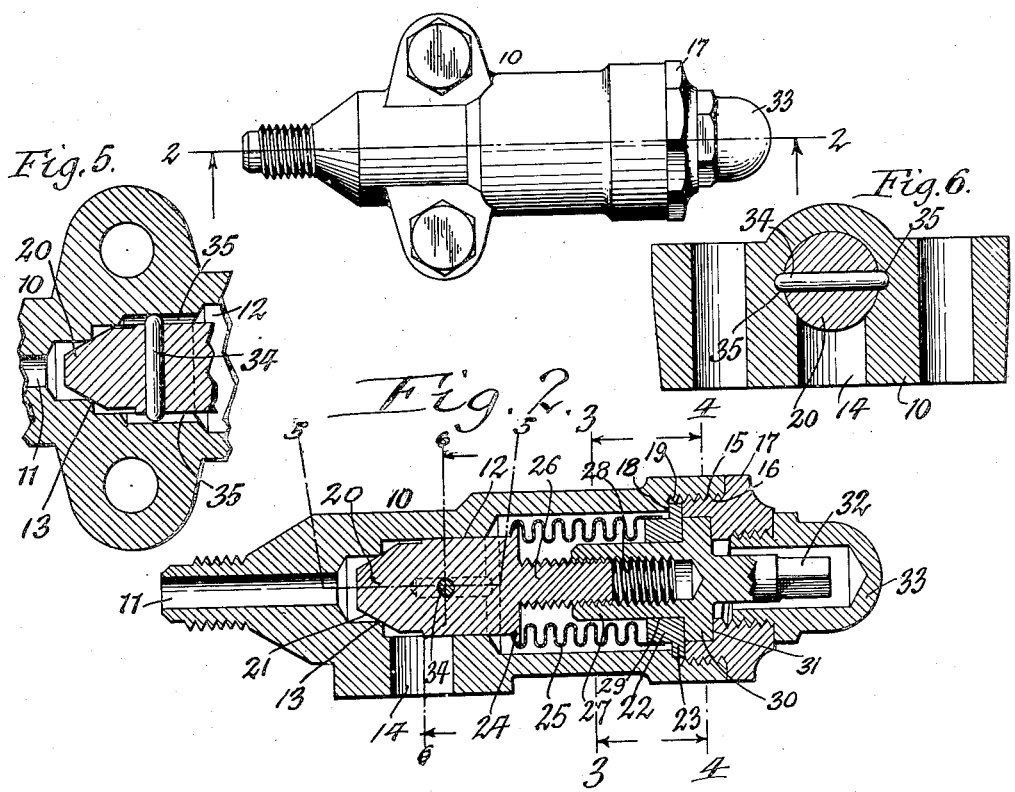
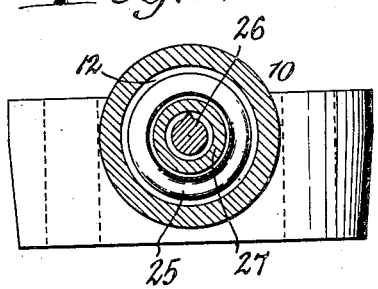
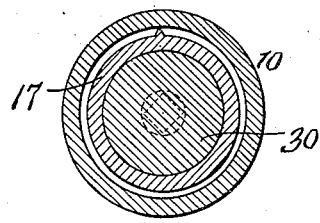
Inventor
Franklin G. Slagel
By Popp & Powers
Attorneys Patented Apr. 21, 1931

1,802,093

UNITED STATES PATENT OFFICE

FRANKLIN G. SLAGEL, OF BUFFALO, NEW YORK, ASSIGNOR TO FEDDERS MANUFACTURING COMPANY, INC., OF BUFFALO, NEW YORK, A CORPORATION OF NEW YORK

VALVE

Application filed April 1, 1929. Serial No. 351,808.

This invention relates to a valve which is more particularly intended for use in refrigerator systems or other installations in which highly volatile liquids are used or the escape of liquids or gases from the system should be avoided.

Heretofore valves for this purpose have generally been provided with packings between the casing and the valve stem which extended to the exterior for adjusting purposes but this is unsatisfactory on account of the packing becoming loose or worn and in time permitting leakage of the fluid from the conduit system.

It is the object of this invention to provide a valve for this purpose which dispenses with ordinary packing and thereby prevents leakage and still permits of ready adjustment of the valve stopper, and which is of simple and durable construction, easily operable and efficient in service.

In the accompanying drawings:

Fig. 1 is a plan view of the valve embodying my improvements.

Fig. 2 is a longitudinal section of the same.

Figs. 3 and 4 are transverse sections of the same taken on the correspondingly numbered lines in Fig. 2.

Fig. 5 is a fragmentary longitudinal section taken on line 5—5, Fig. 2.

Fig. 6 is a cross section taken on line 6—6, Fig. 2.

In the following description similar characters of reference indicate like parts in the several figures of the drawings.

The numeral 10 represents the body or enclosing casing of the valve which forms a valve chamber 12, an inlet 11 opening into one end of the valve chamber and having a valve seat 13 and an outlet 14 opening into the side of said chamber adjacent to said valve seat. At its opposite end the valve chamber of the casing is provided with an internal screw thread 15 which is engaged by an external screw thread 16 of a cover 17, and adjacent to the inner end of the thread 15 the casing is provided with an outwardly facing shoulder 18 which is arranged opposite the inner end of the cover 17 and forms with the same an annular groove 19.

Movable lengthwise in the inner part of the valve chamber is a valve closure or stopper 20 the face 21 of which is preferably of conical form and adapted to move toward and from the internal valve seat 13 for closing and opening the passageway through the valve from the inlet to the outlet thereof.

Arranged within the outer part of the valve chamber is a supporting ring 22 having an external annular flange 23 which is arranged in the groove 19 and adapted to be firmly clamped between the inner end of the cover 17 and the shoulder 18 of the casing so as to form a leaktight joint between these parts. Within the valve chamber and between the valve closure and supporting ring is arranged axially a bellows or accordion diaphragm 25, the inner end of which is connected by sweating or brazing with an annular flange 24 on the stem 26 of the valve closure while the outer end of this diaphragm is secured by brazing or sweating to the inner end of the supporting ring, as shown in Fig. 2.

By these means a leaktight joint is formed between the valve closure and the rear end of the valve casing which positively prevents the escape of any fluid either in liquid or gaseous form and still permits the valve closure to be moved toward and from its seat by adjusting means connected with the rear end of the valve stem. These adjusting means in their preferred form consist of an externally screw threaded shank 26 projecting rearwardly or outwardly from the stem of the valve closure and an adjusting sleeve 27 having an internally screw threaded bore 28 which receives the screw shank 26 and is capable of turning but held against longitudinal movement, whereby rotation of the adjusting sleeve will cause the valve closure to be opened or shut. For this purpose the adjusting sleeve 27 has its rear part journaled in a bearing opening 29 in the supporting ring 22 and provided with an annular external flange 30 which is confined in an annular groove formed between the outer side of the supporting ring and a rabbet 31 on the inner side of the cover 17. Turning of the adjusting sleeve is preferably effected by a flat sided wrench stem 32 projecting outwardly from the adjusting sleeve through the cover 17 and adapted to receive a wrench or key of appropriate form for turning the same. To reduce liability of tampering with the valve after the same is set the wrench stem is concealed by a cap 33 which encloses the wrench stem and is connected by a screw joint with the opening in the cover.

Upon turning the adjusting sleeve the valve is moved toward or from its seat and during this time the bellows diaphragm expands and contracts lengthwise but does not open any joints leading to the exterior of the casing so that leakage is positively avoided and renders this valve particularly suited for use where this is a desirable feature.

For the purpose of preventing the valve closure 20 from turning and the bellows from becoming distorted when opening and closing the valve closure the latter is provided with a transverse key or pin 34 the opposite ends of which project from the opposite sides of the valve into longitudinal key-ways or grooves 35 in opposite sides of the valve chamber, thereby permitting the valve closure to move freely lengthwise into its open and closed position but preventing the same from turning and the bellows from twisting out of shape.

As a whole this construction provides a packless valve which can be readily operated from the exterior without liability of leakage, the same is very compact, and it contains no parts which are likely to get out of order.

I claim as my invention:—

1. A valve comprising a casing having a valve chamber, an inlet, an outlet, a valve seat at one end between said inlet and outlet, an internal longitudinal guide groove, and an outwardly facing shoulder at its opposite end, a cover having a screw connection with said casing and facing said shoulder on the casing, a supporting ring having a flange arranged between said shoulder and cover, a valve closure movable toward and from said seat, a bellows diaphragm connecting said valve closure and supporting ring, means for actuating said valve closure, including an adjusting sleeve having a screw connection with said valve closure and provided with a flange arranged between said supporting ring and cover, and a guide pin arranged on said valve closure and slidable lengthwise in said groove.

2. A valve comprising a casing having a valve chamber, an inlet, an outlet, a valve seat at one end between said inlet and outlet, an internal longitudinal guide groove, and an outwardly facing shoulder at its opposite end, a cover having a screw connection with said casing and having a rabbet and facing said shoulder on the casing, a supporting ring having a flange arranged between said shoulder and cover, a valve closure movable toward and from said seat, a bellows diaphragm connecting said valve closure and supporting ring, means for actuating said valve closure, including an adjusting sleeve having a screw connection with said valve closure and provided with a flange arranged between said supporting ring and the rabbet on said cover, an adjusting stem projecting from said adjusting sleeve outwardly through said cover, a cap enclosing said adjusting stem and having a screw connection with said cover, and a guide pin arranged on said valve closure and slidable lengthwise in said groove.

In testimony whereof I hereby affix my signature.

FRANKLIN G. SLAGEL.